United States Patent [19]

Fork et al.

[11] 4,400,814
[45] Aug. 23, 1983

[54] SUBPICOSECOND RING LASER

[75] Inventors: Richard L. Fork, Middletown; Benjamin I. Greene, Matawan; Charles V. Shank, Holmdel, all of N.J.

[73] Assignee: Bell Telephone Laboratories, Incorporated, Murray Hill, N.J.

[21] Appl. No.: 259,548

[22] Filed: May 1, 1981

[51] Int. Cl.$^3$ ............................................. H01S 3/083
[52] U.S. Cl. ........................................ 372/94; 372/18; 372/20; 372/32; 372/26
[58] Field of Search .................... 372/18, 26, 32, 20, 372/94

[56] References Cited

U.S. PATENT DOCUMENTS 3,978,429  10/1976  Ippen et al. ........................... 372/18
4,227,159  10/1980  Barrett et al. ......................... 372/18

OTHER PUBLICATIONS

"Wavelength Tuning of an Intracavity Pumped cw Mode-Locked Dye Laser"; Runge; Opt. Comm., vol. 5, No. 5, Aug. 1972.
"Pulse Evolution in Mode-Locked Quasi-Cont. Lasers"; New; IEEE Jou. of Quant. Elect., vol. QE-10, No. 2, Feb. 2, 1974.
"Unidirect. Traveling Wave Operation of a Mode--Locked Nd:Glass Ring Laser"; Fedosejevs et al.; Tech. Digest of 9th Int. Conf. on Quant. Elect., 1976, pp. 68D-69D.
"Methods of Generation", Bradley; Topics in Appl. Phys., vol. 18, 1977.
"Frequency Stabilization of a cw Dye Laser"; Grove et al., Proceedings of the Soc. of Photo-Optical Instru. Eng., vol. 49, Impact of Lasers in Spectroscopy, San Diego, Calif., USA (Aug. 19-20, 1974).
"Laser Mode-Locking with Saturable Absorbers", Garmire et al., IEEE Jour. Quant. Elect., vol. QE—3, No. 6, 1967 Jun., pp. 222-226.
"Relationship Between Saturable Absorber Cell Length and Pulse Duration in Passively Mode-Locked Lasers", Bradley et al., Opt. Comm., vol. 2, No. 1, May/Jun. 1970.
"Subpicosecond Kilowatt Pulses from a Mode-Locked cw Dye Laser", Shank et al.; Appl. Phys. Lett., vol. 24, No. 8, Apr. 15, 1974.
"Passive Mode Locking of the cw Dye Laser", Ippen et al.; Appl. Phys. Lett., vol. 21, No. 8, Oct. 15, 1972.
"A Mode-Locked cw Dye Laser", Dienes et al.; Appl. Phys. Lett., vol. 19, No. 8, Oct. 1974.

Primary Examiner—William L. Sikes
Assistant Examiner—Léon Scott, Jr.
Attorney, Agent, or Firm—Daniel D. Dubosky; Michael J. Urbano

[57] ABSTRACT

A ring cavity laser is disclosed wherein a Rhodamine 6G dye stream is used as the gain medium, and a saturable absorber stream is positioned in the ring cavity at a point such that the time difference between pulses arriving at the gain stream is not small compared to the recovery time of the gain medium. The saturable absorber is DODCI dissolved in ethylene glycol passed through a specially constructed nozzle that creates a dye stream having a thickness of about 10 microns in the optical cavity. As a result of this thin saturable absorber, the two counterpropagating pulses that collide in the saturable absorber are caused to interact in a way that results in a decrease of the pulse duration and an equalization of the pulse intensities.

11 Claims, 5 Drawing Figures

SUBPICOSECOND RING LASER

BACKGROUND OF THE INVENTION

This invention relates to passively modelocked lasers that are capable of generating subpicosecond pulses. The use of passive modelocking in cw dye lasers to generate subpicosecond optical pulses is now a well-established technique. See, for example, the article entitled "Passive Mode locking of the cw Dye laser," by E. P. Ippen, C. V. Shank and A. Dienes, *Applied Physics Letters*, Vol. 21, No. 8, Oct. 15, 1972, pp. 348–350. In the Ippen et al laser, a Rhodamine 6G dye cell is placed in a linear laser cavity and pumped by a continuous argon laser. At the other end of the laser cavity is a dye cell containing a solution of DODCI (diethyloxadicarbocyanine iodide) in methanol. This second dye cell acts as a saturable absorber for the Rhodamine 6G emission. Both the active medium cell and the absorber cell are about 1 mm thick in this prior art embodiment and the laser produced a pulse as short as 1.5 picoseconds.

A variation in the linear cavity laser was disclosed by D. J. Bradley in his article in Vol. 18, pp. 53–57 of *Topics in Applied Physics* entitled "Methods of Generation," Springer-Verlag, 1977. In the Bradley laser, the absorber dye was placed at the extreme end of the linear laser cavity in direct contact with a broadband 100 percent reflectivity mirror and caused to flow in a narrow channel of thickness variable from 200 μm to 500 μm. Bradley and his coworkers noted that a decrease in the thickness of the absorber cell resulted in a decrease of the pulse durations. This technique of placing the absorber cell in direct contact with one mirror of the linear laser cavity was also reported by Bradley and his coworkers in an article entitled "Relationship Between Saturable Absorber Cell Length and Pulse Duration in Passively Mode-Locked Lasers," by D. J. Bradley, G. H. C. New and S. J. Caughey, *Optics Communications*, Vol. 2, No. 1, 1970, pp. 41–44. As should be apparent to those skilled in the art, there are fabrication problems associated with having the absorber in direct contact with the cavity end mirror. One difficulty is of having the reflecting surface, the absorber, and the focused laser mode all in the same location. Focusing is required to make the absorbing region sufficiently small and this leads to degradation of the absorber on the reflecting surface.

A subsequent article by one of Bradley's coworkers presented an analysis of his linear laser in the *IEEE Journal of Quantum Electronics*, Vol. QE-10, No. 2, February 1974, pp. 115–124. See the article entitled "Pulse Evolution in Mode-Locked Quasi-Continuous Lasers," by G. H. C. New. In this article by New it is pointed out that single pulse operation is desirable and it is stated that if multiple pulsing develops, it is unlikely that compression occurs for any of the pulses in the cavity. Conclusions of this type were in keeping with similar conclusions developed by those skilled in the art that had been experimenting with ring laser structures. As was well-known in the art, a modelocked ring laser generally had two counterpropagating pulses in the resonant cavity that coincide at the modelocking element. See, for example, the abstract of the talk by R. Fedosejevs et al as reported in the *Technical Digest of the 9th International Conference on Quantum Electronics*, 1976, pp. 68D–69D. As reported by Fedosejevs et al it was believed by those skilled in the art who were using ring laser cavities that one of the pulses must be suppressed in order to achieve stable trains of pulses with short durations. In the reported talk by Fedosejevs et al, several schemes are described for removing the effect of the second pulse in the ring laser cavity.

The closest that the prior art has come to a position that can be construed as tolerating a second pulse is reported by E. N. Garmire et al in their article entitled "Laser Mode-Locking with Saturable Absorbers," *IEEE Journal of Quantum Electronics*, Vol. QE-3, No. 6, June 1967, pp. 222–226. In the Garmire article which presented an analysis of modelocking with saturable absorbers in a linear laser, they come to the conclusion that the condition of two traveling pulses at any one time inside the cavity is almost as favorable as that of a single pulse. This conclusion by Garmire et al is based on a first order analysis of the amount of energy absorbed by the dye. As pointed out in the article, "To second order, a single pulse is slightly favored."

SUMMARY OF THE INVENTION

The present invention is based upon our discovery that two counterpropagating pulses are not only tolerable in a ring laser configuration but actually necessary in order to create pulses of extremely short duration. In accordance with the present invention, the two oppositely directly pulses in a ring laser configuration are caused to pass through a thin saturable absorber having a thickness approximately equal to or less than the full width at half maximum (FWHM) of the pulse times the velocity of light in the absorber medium ($V_o$). The interaction of the two counterpropagating pulses has been determined to create a transient grating in the population of the absorber molecules which synchronizes, stabilizes and shortens the pulses in both counterpropagating pulse trains in an unexpected and advantageous way. The principle requirement for this new process of colliding pulse modelocking is that the difference in arrival time of the two interfering pulses be small compared to (FWHM×$V_o$), the spatial width of the pulse. This requirement is met by focusing the light beam in the saturable absorber such that $U_o$ is substantially equal to $1/(\sigma)$, where $U_o$ is the number of photons per cm$^2$ and the $\sigma$ is the absorber cross section. (For a simple two level system, such as in an atomic vapor, this requirement would by $U_o = 1/2\sigma$.)

In the embodiment disclosed, a Rhodamine 6G gain medium is flowed through a ring laser cavity and pumped by a continuous argon laser having wavelength of 5145 Å. A saturable absorber stream consisting of DODCI dissolved in ethylene glycol is also flowed through the ring laser cavity at a position that is nonsymmetrical with respect to the gain medium. In this embodiment which was constructed, a special nozzle was used to generate an absorber dye stream having a thickness of approximately 10 microns.

BRIEF DESCRIPTION OF THE DRAWING

The invention will be more readily understood after reading the following detailed description in conjunction with the drawings wherein.

DETAILED DESCRIPTION

Figure 1:
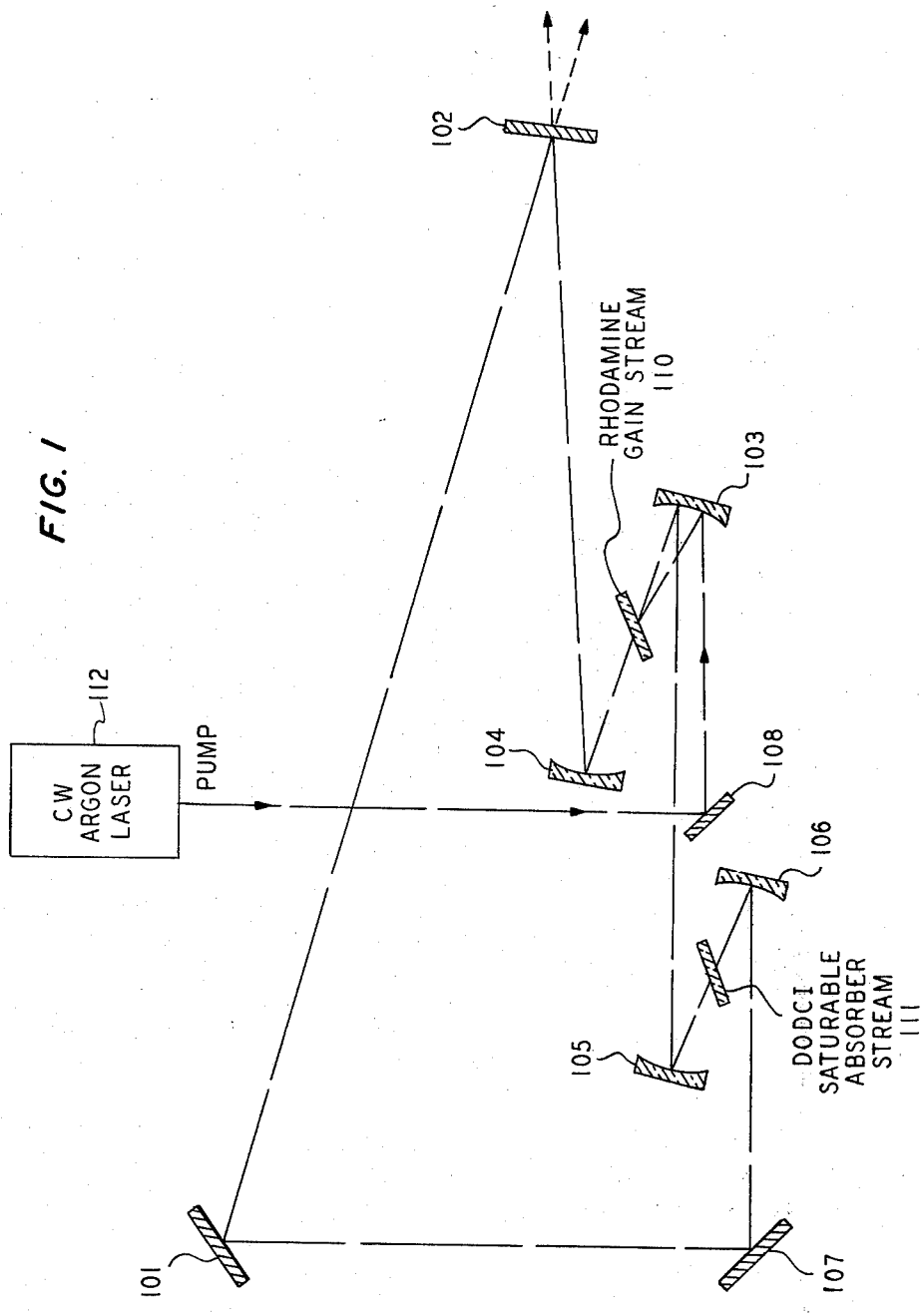
FIG. 1 is a schematic block diagram of a ring laser constructed in accordance with the present invention.

The embodiment which was constructed to practice the present invention is illustrated in FIG. 1. As indicated in FIG. 1, mirrors 101 through 107 are arranged to form a ring laser cavity. Mirrors 101 and 107 are 100 percent reflective whereas mirror 102 is partially transmissive thereby permitting pulses that are generated in the ring laser cavity to be coupled out of the cavity. The curvature of mirrors 103 through 106 is selected such that the laser operates in the lowest transverse mode. In addition, the mirrors 103 and 104 (10 cm radius of curvature) are positioned so as to focus the generated light pulses into a gain medium stream 110 consisting of Rhodamine 6G in ethylene glycol at a concentration which absorbs approximately 90 percent of the pump light at 5145 Å. Mirrors 105 and 106 (5 cm radius of curvature) are positioned so as to focus the generated light pulses into a saturable absorber stream 111 consisting of DODCI (diethyloxadicarbocyanine iodide) dissolved in ethylene glycol with a measured small signal loss of approximately 20 percent at the absorption peak (580 mm). The curvature of mirrors 103 through 106 is also selected so as to achieve the stability conditions that involve the beam cross sections in the amplifying and absorbing regions ($A_a$ and $A_b$, respectively) and the amplifier and absorber molecular cross sections ($\sigma_a$ and $\sigma_b$, respectively). These parameters are usually related by the Equation $s = k(A_a\sigma_b/A_b\sigma_a)$. In the present embodiment, k equals two because the saturation occurs by way of standing waves, and the curvature of the mirrors must be selected such that the beam cross sections $A_a$ and $A_b$ result in a parameter s that is much greater than one.

It is desirable to avoid placing the gain stream so that one pulse passes through it with a time delay after the preceding pulse which is short compared to the recovery time of the gain medium. The short delay condition tends to cause one pulse to be larger in magnitude than the other and this in turn degrades the contrast in the interference pattern. The one exception to this rule occurs when the gain stream is exactly opposite the absorber stream. Then the two pulses pass through the gain stream at precisely the same time so as to form an interference pattern in the gain stream similar to that formed in the absorber. This condition may produce some additional pulse shortening.

The nozzle that is used to create the gain medium stream 110 is a conventional commercial stainless steel nozzle having an interior thickness of 15 mils, whereas the nozzle that is used to create the saturable absorber stream 111 is specially constructed in a manner to be described hereinafter so as to create an absorber stream having a thickness of about 10 microns. The gain stream 110 is pumped by a continuous argon laser 112 whose output is coupled by way of a mirror 108 onto the curved surface of mirror 103. This pump beam from laser 112 is reflected by mirror 103 so as to cause the beam to impinge on the gain medium stream 110.

Figure 2:
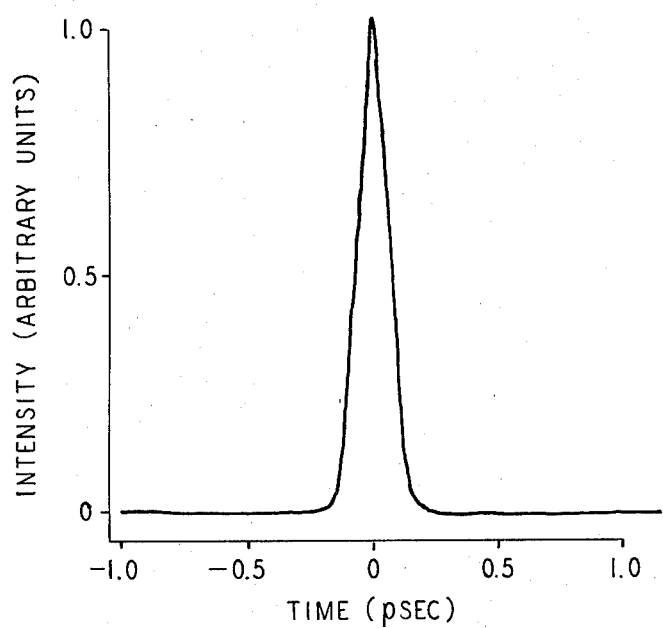
FIG. 2 is a graph of the autocorrelation function intensity versus time for a typical pulse produced by the apparatus shown in FIG. 1.

With this ring laser configuration having the specially constructed absorber jet that resulted in a 10 micron absorber stream thickness, pulses having the autocorrelation function shape shown in the graph of FIG. 2 were created at the output side of mirror 102. The output pulse width was measured using the background free auto correlation method in KDP described in the article entitled "Ultra-short Light Pulses," by E. P. Ippen and C. V. Shank, *Topics in Applied Physics* Vol. 18, p. 83, published by Springer-Verlag, New York, 1977. This pulse shown in FIG. 2 has an autocorrelation function one half width of 0.14 picoseconds. This, in turn, corresponds to an optical pulse FWHM (full width at half maximum) $\tau_p$ of less than 0.1 picoseconds. If we assume an $\text{sech}^2$ pulse shape, we obtain a pulse width of 90 femtoseconds. The spectral width was measured to be $50 \pm 10$ Å which is close to the transform limit for a 90 femtosecond pulse.

It was unnecessary to limit the resonator bandwidth with an intra-cavity prism. It was determined that a thin uncoated pellicle etalon having a thickness of approximately 2 microns can be inserted into the resonator in order to slightly decrease the wings of the pulse. The average power output was measured to be 50 mW from each of the two counterpropagating beams where the output mirror 102 had a transmissivity of 3 percent. The pump power from laser 112 was varied from 5 to 7 watts with little change in pulse width.

Figure 3:
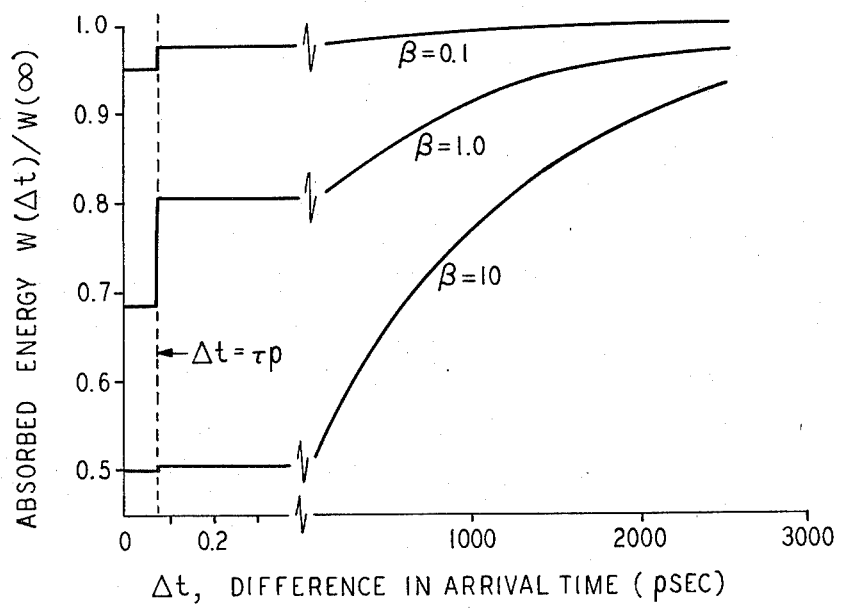
FIG. 3 is a graph which helps illustrate the optimum working parameters for the apparatus shown in FIG. 1, and FIGS. 4 and 5 are illustrations which aid in the description of the phenomenon which is believed to occur within the saturable absorber that contributes to a significant shortening of the pulse durations.

Synchronization of the two counterpropagating pulses occurs in the ring laser because minimum energy is lost to the saturable absorber when the two pulses meet in the thin absorber stream. Some insight can be gained into how this synchronization occurs by calculating the energy that is lost in the absorber as a function of the difference in arrival time of the two pulses at the saturable absorber. FIG. 3 shows a plot of a ratio $W(\Delta t)/W(\infty)$ versus $\Delta t$, the difference in arrival time, where $W(\Delta t)$ is the pulse energy lost to the absorber for a difference in pulse arrival time $\Delta t$, and $W(\infty)$ is the energy absorbed for $\Delta t$ much greater than the absorber recovery time. Note that the recovery time (duration of the upwardly curved segments of FIG. 3) is slow compared to $\tau_p$. In essence $W(\infty)$ corresponds to the energy absorbed where the pulses are going through independently with each pulse having no effect on the absorber that carries over to the other pulse. Curves are shown in FIG. 3 for various saturation energies defined by a parameter $\beta$. The parameter $\beta$ equals $\sigma U_o$, where $\sigma$ is the absorber cross section, and $U_o$ is the pulse energy density or number of photons per $\text{cm}^2$. As indicated in FIG. 3, the ratio of energies is a minimum at $\Delta t = 0$, that is, when the pulses completely overlap. This minimum near $\Delta t = 0$ is most pronounced at intermediate energies where $\beta$ is approximately equal to one. To achieve the most pronounced minimum for any given absorber cross section, $\sigma$, the number of photons per $\text{cm}^2$ can be ajusted, of course, by changing the focusing properties of mirrors 105 and 106, or to a lesser extent, by changing the pump rate.

When the absorber stream thickness is approximately equal to or less than the spatial pulse width as in the present invention, several additional pulse forming mechanisms are believed to occur in the saturable absorber. First the trailing edge of the pulse is believed to experience additional loss relative to the peak since the standing wave contrast in the optical field intensity is reduced when the trailing edges of the two pulses overlap. This phenomenon can best be explained by referring to FIGS. 4 and 5 in the drawing. As pointed out hereinabove the two counterpropagating pulses are synchronized by the absorber such that these two pulses tend to overlap in the absorber region. As will be apparent to those skilled in the art, the leading edges of these pulses tend to be decreased in amplitude by the fact that these leading edges are absorbed by the absorber molecules in the absorber region. When the pulses propagate to the point where they are completely overlapping as shown in waveform C of FIG. 4, the interfering pulses create an optical field intensity pattern of the type illustrated in waveform B of FIG. 4. With this optical field intensity pattern, the population of the absorber molecules can be illustrated by the curve shown as waveform A in FIG. 4. As indicated in waveform A there are fewer absorber molecules at the points where the optical field intensity is greatest. Similarly, where the optical field intensity is at a minimum, there is a maximum in the population of molecules that are ready to absorb. Simply stated, the absorber population is depleted preferentially where the optical field is large, and a transient grating in the population of absorber molecules is produced.

Figure 5:
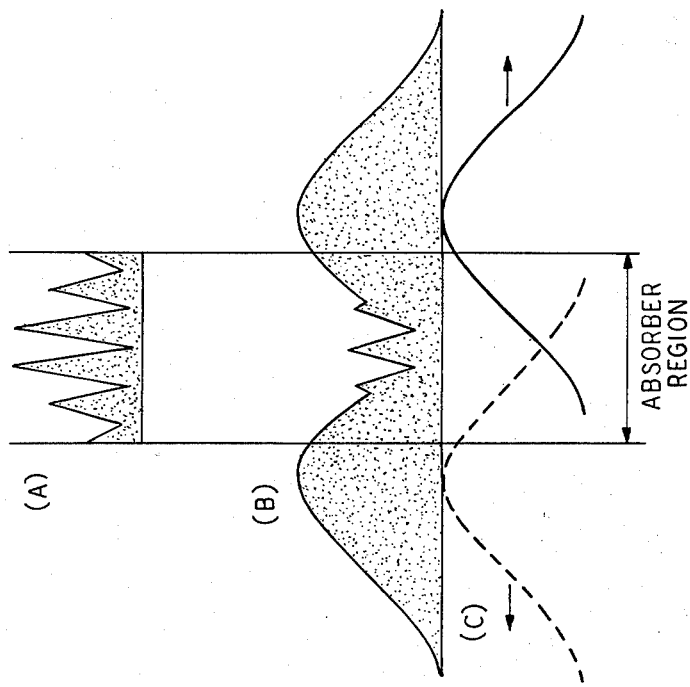

As the pulses proceed in their opposite directions, they arrive at the position shown in waveform C in FIG. 5 where the peaks of the pulse have left the absorber medium but the tails are still present within the absorber region. At this point in time, the optical field intensity has low average contrast as illustrated in waveform B in FIG. 5. Much of the optical field intensity in waveform B is present at points in the absorber where there are still significant peaks in the absorber population. As a result, much of this optical energy is absorbed by the remaining absorber molecules, thereby causing a decrease in the energy at the trailing edge of the pulse.

Figure 4:
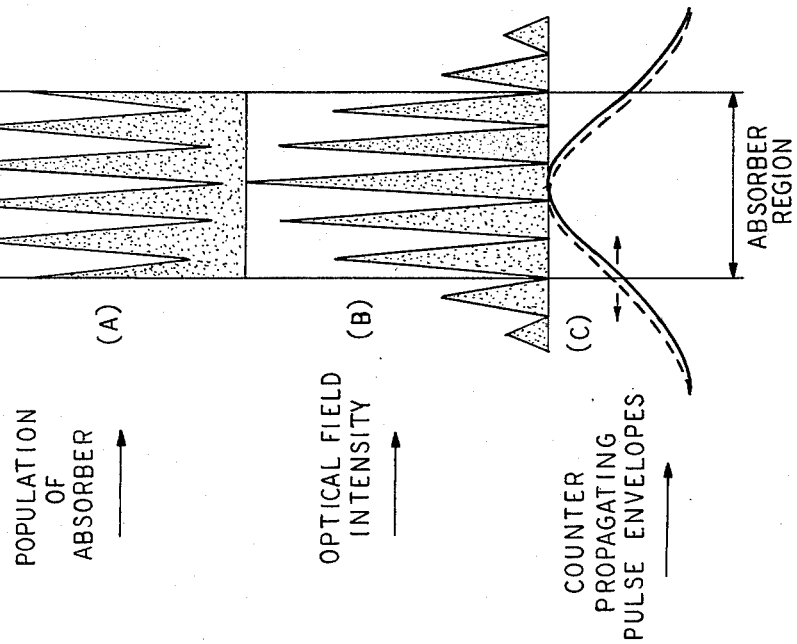

A second significant phenomenon that is believed to arise within the absorber region and hence to contribute to the operation of the present invention is an exchange of energy between the two pulses when they interact with the absorption grating created by the standing wave saturation as illustrated in FIG. 4. As a result both pulses tend to equalize their energy even though one pulse may experience less net gain in propagating around the ring laser cavity.

The nozzle which is used to create a saturable absorber dye stream having a 10 micron thickness is specially constructed from a commercially available stainless steel nozzle. The nozzle as available from Coherent Radiation Inc., has an interior opening at the jet end of 15 mils thickness by 70 mils interior width. The wall thickness of the jet is equal to 10 mils. This commercially available stainless steel nozzle is modified by compressing the jet end in 4 steps with mandrils inserted into the opening. First, a mandril made of polished shim stock 10 mils thick and 60 mils wide is inserted into the nozzle tip. Care must be taken to insure that there are no burrs or rought spots on the shim stock. Otherwise, rough spots in the nozzle will be created and the resulting jet stream will not be flat with a smooth flow across its width. The jet with the inserted mandril is then placed into the jaws of a Stanley 1-½ inch width drill press vise. The vise must also have smooth and parallel jaws with extreme care being taken so as to not put excessive pressure on the nozzle when compressing. Compression should be stopped when a moderate amount of resistance to tightening is felt. If the vise is tightened too much and the nozzle is squeezed too hard, it will be difficult to remove the mandril and the inside of the nozzle will consequently be scratched. Only 25 mils of the 250 mil length nozzle is inserted into the jaws of the vise. The area of compression is purposely kept relatively small so as to not impede the flow of the dye in its highly viscous solvent (ethylene glycol). Care must be taken to ensure that the nozzle is both perpendicular to the jaws and parallel to the work surface, otherwise the resulting stream may flow out of the jet at some angle other than the desired one.

After the first compression, the nozzle has a 10 mils interior thickness and 72 mil interior width. In preparation for the second compression a piece of shim stock 5 mils thick is inserted into the jet and the nozzle is compressed using the same precautions set forth hereinabove. This second step yields a nozzle having 5 mils interior thickness and 80 mils interior width. After this second step, the nozzle begins to take a slightly different shape from that of the original nozzle. The resulting nozzle has been found to be parallel in the center portion with an opening at each end that is slightly wider than the opening in the center. This widening of the opening at each end is desirable because it causes the stream to flair out thereby giving a thinner center region.

During the third compressive step, a shim stock of 2.5 mils is inserted into the nozzle and the compression has been found to yield a nozzle having 3 mils interior thickness and 81 mils interior width. The final compressive step is performed with a mandril made of shim stock 0.6 mils thick. This type mandril is not commercially available so it was made by taking a 1 mil thick piece of brass stock and polishing down to a thickness of 0.6 mils. Polishing was accomplished by hand using number 4/0 Emery polishing paper. During the final compressive stage, great care must be taken not to squeeze too hard due to the thinness of the shim stock. If the stock is compressed too tightly by the nozzle, it cannot be removed from the nozzle and will simply rip off at the tip. This will render the nozzle useless. The final compressive step yields a nozzle having an interior thickness of 1 mil or 25 microns and an interior width of about 84 mils. This nozzle has been determined to produce a dye stream having thickness of about 10 microns in the flared portion of the stream.

What has been described hereinabove is an illustrative embodiment of the present invention. The invention is equally applicable to other environments. For example, the ring laser may be constructed in a semiconductor environment where the absorber region is created by bombarding a narrow strip in the ring laser cavity with a high energy ion beam.

What is claimed is:

1. A ring laser for generating subpicosecond optical pulses comprising:
   means forming an optical ring cavity,
   a gain medium and an optical absorber medium positioned at different locations within said ring cavity, and
   means for pumping said gain medium to create lasing action in the form of said pulses, each of said pulses propagating through said absorber medium and having therein a spatial length equal to the product of the pulse time-duration measured at half the maximum pulse amplitude times the velocity of light in said absorber medium,
characterized in that
   said laser is adapted to generate at least two counterpropagating pulses which overlap in said absorber medium, and the length of the optical path of said pulses in said absorber medium is approximately equal to or less than the spatial length of said pulses therein.

2. A ring laser as defined in claim 1 wherein said optical ring cavity includes means for focusing the generated pulses into said absorber region such that $U_o$, the number of photons per cm$^2$, is approximately equal to the reciprocal of $\sigma$, the optical absorption cross section of said absorber medium.

3. A ring laser as defined in claim 1 wherein said gain medium and said absorber medium are liquid dyes that are caused to flow through said optical ring cavity.

4. A ring laser as defined in claim 3 wherein said gain medium is Rhodamine 6G dye.

5. A ring laser as defined in claim 4 wherein said absorber medium is a dye consisting of DODCI dissolved in ethylene glycol.

6. A ring laser as defined in claim 5 wherein said absorber medium is created by flowing the DODCI dissolved in ethylene glycol through a stainless steel nozzle having an interior thickness approximately equal to 1 mil.

7. The laser of claim 1 wherein said cavity forming means is adapted so that said lasing action occurs in the lowest order transverse mode.

8. The laser of claim 1 wherein said pumping means comprises a continuous-wave laser.

9. The laser of claim 1 wherein said absorber medium has a recovery time which is slow compared to the time-duration of said pulses.

10. The laser of claim 1 wherein said laser is adapted so that (1) said overlapping pulses in said absorber medium produce a transient grating in the population of molecules in said absorber medium and (2) the difference in arrival time of said overlapping pulses is less than the time-duration of said pulses.

11. A ring laser for generating subpicosecond pulses comprising:
a plurality of reflectors establishing an optical ring cavity, at least one of said reflectors being a partially transmissive output reflector which permits egress of said pulses from said cavity,
a gain medium positioned within said cavity between a first pair of said reflectors, said first pair comprising curved reflectors effective to focus said pulses onto said gain medium,
an optical absorber medium of molecules positioned at a location different from said gain medium and between a second pair of said reflectors, said second pair comprising curved reflectors effective to focus said pulses onto said absorber medium so that $U_o$, the number of photons per square centimeter, is approximately equal to the reciprocal of $\sigma$, the optical absorption cross section of said absorber medium,
means for pumping said gain medium to create lasing action in the form of two trains of counterpropagating pulses which overlap in said absorber medium to create therein a transient grating in said molecules, each of said pulses having in said absorber medium a spatial length equal to the product of the pulse time-duration measured at half the maximum pulse amplitude times the velocity of light in said absorber medium,
the length of the optical path of said pulses in said absorber medium being approximately equal to or less than the spatial length of said pulses therein,
said absorber medium having a recovery time which is slow compared to the time-duration of said pulses, and
said reflectors being adapted so that said lasing action occurs in the lowest order transverse mode.

* * * * *

UNITED STATES PATENT AND TRADEMARK OFFICE
CERTIFICATE OF CORRECTION

PATENT NO. : 4,400,814

DATED : August 23, 1983

INVENTOR(S) : Richard L. Fork, Benjamin I. Greene and Charles V. Shank

It is certified that error appears in the above—identified patent and that said Letters Patent is hereby corrected as shown below:

In column 1, line 10, "locking" should read --Locking--; line 10, "laser" should read --Laser--. Column 2, line 47, "by" should read --be--. Column 3, line 30, "mm" should read --nm--. Column 4, line 5, "auto correlation" should read --autocorrelation--; line 10, "one half" should read --one-half--. Column 5, line 56, "rought" should read --rough--.

Signed and Sealed this

Twenty-fifth Day of October 1983

[SEAL]

Attest:

GERALD J. MOSSINGHOFF

Attesting Officer

Commissioner of Patents and Trademarks